Figure 1:
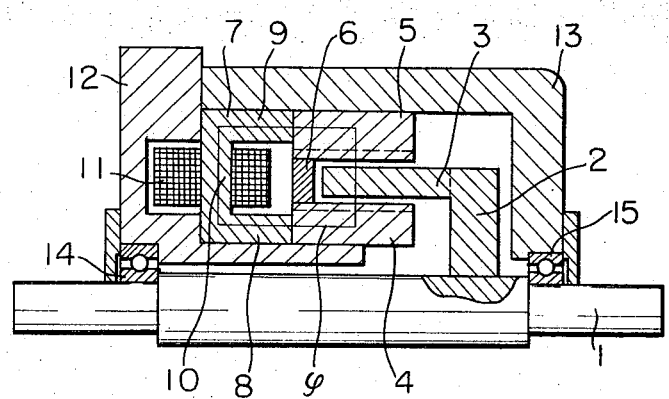

United States Patent
Inaba

[11] 3,864,588
[45] Feb. 4, 1975

[54] ELECTRIC PULSE MOTOR
[75] Inventor: Seiuemon Inaba, Kawasaki, Japan
[73] Assignee: Fujitsu Limited, Kanagawa-ken, Japan
[22] Filed: Nov. 8, 1972
[21] Appl. No.: 304,657

Related U.S. Application Data
[63] Continuation-in-part of Ser. No. 110,084, Jan. 27, 1971, abandoned.

[30] Foreign Application Priority Data
Feb. 7, 1970  Japan............................ 45-12589[U]
Feb. 7, 1970  Japan............................ 45-12590[U]

[52] U.S. Cl.................... 310/266, 310/49, 310/161
[51] Int. Cl.............................................. H02k 1/22
[58] Field of Search............. 310/49, 161, 162, 163, 310/67, 154, 171, 168, 169, 261, 265, 266, 115, 165, 116, 180, 256, 46

[56] References Cited
UNITED STATES PATENTS

| | | | |
|---|---|---|---|
| 2,541,830 | 2/1951 | Phaneuf | 310/163 |
| 3,081,624 | 3/1963 | Mayer | 310/168 |
| 3,134,037 | 5/1964 | Upton | 310/266 |
| 3,344,378 | 9/1967 | Wilhelmson | 310/49 |
| 3,462,626 | 8/1969 | Kluss | 310/266 |
| 3,469,124 | 9/1969 | Willcox | 310/266 |
| 3,519,859 | 7/1970 | Morreale | 310/266 |
| 3,603,826 | 9/1971 | Saretzky | 310/266 |

*Primary Examiner*—R. Skudy
*Attorney, Agent, or Firm*—Robert E. Burns; Emmanuel J. Lobato; Bruce L. Adams

[57] ABSTRACT

An electric pulse motor is provided with a cup-shaped type rotor element having a plurality of rotor-teeth arranged circumferentially spaced at predetermined equal spaced intervals and projecting in an axial direction. The motor has a plurality of separate U-shaped stator elements which have a plurality of stator-teeth arranged at the same pitch as the rotor-teeth and disposed facing the rotor-teeth in the radial direction, with the rotor-teeth between the stator-teeth in the radial direction. The stator-teeth are shifted in a circumferential direction relative to the related stator-teeth.

The above-mentioned pulse motor arrangement makes it possible to sufficiently lessen the rotor inertia thereof while effectively generating output torque, as well as to perform reversible driving and further, the individual stator element has a simplified and easily producible structure due to the separate structure thereof.

4 Claims, 6 Drawing Figures

PATENTED FEB 4 1975 3,864,588

SHEET 1 OF 2

AN ELECTRIC PULSE MOTOR

The present application is a Continuation-In-Part Application of application Ser. No. 110.084, filed Jan. 27, 1971, now abandoned.

The present invention relates to an electric pulse motor of excellent performance having a compact and simplified structure and capable of being easily assembled.

A known electric pulse motor has a structure in which a number polepieces different phase sections, for example, three or five different phase sections are arranged individually in an axial direction, and each section comprises a rotor element provided with a number of equally-spaced rotor-teeth projecting radially from the circumference, and a number of stator elements provided with a plurality of stator-teeth facing the rotor-teeth at the outer peripheral portion of this rotor element.

The above-described known electric pulse motor structure is accompanied by defects such that the electric pulse motor is too large in size in the axial direction due to the axial arrangement of the different phase sections, and there is a limit to the output torque generated thereby. Since the mass of the entire rotor including a plurality of rotor elements is very large, a sufficient starting torque thereof cannot be obtained.

An electric pulse motor relating to the present invention is provided with an arrangement wherein, for a rotor element having a plurality of rotor-teeth arranged on a circumference at equally spaced intervals, there is provided a plurality of U-shaped stator elements having a plurality of stator-teeth arranged at the same pitch as the rotor-teeth while facing each other in the radial direction and radially spaced so as to have the rotor-teeth extending axially between them. The stator elements are arranged in such a manner that the phase of the stator teeth between different phases of the stator elements is shifted spatially in a circumferential direction.

Also, the respective stator elements are provided with separable structures at least at a portion thereof.

Therefore, it is an object of the present invention to provide an electric pulse motor of excellent characteristics with an improved torque-inertia ratio thereof.

It is another object of the present invention to provide an electric pulse motor of superior performance, capable of being easily assembled and having a simplified structure.

Other features and advantages of the present invention will be apparent from the ensuing description with reference to the accompanying drawings in which, however, the scope of the invention is no way limited.

Figure 2:
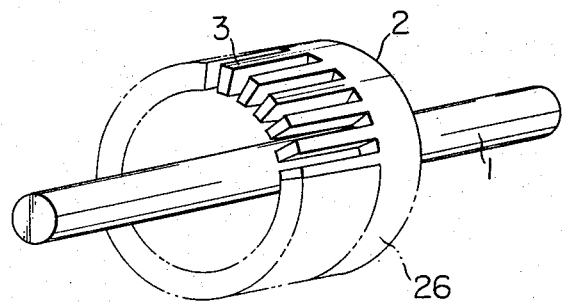
Figure 3:
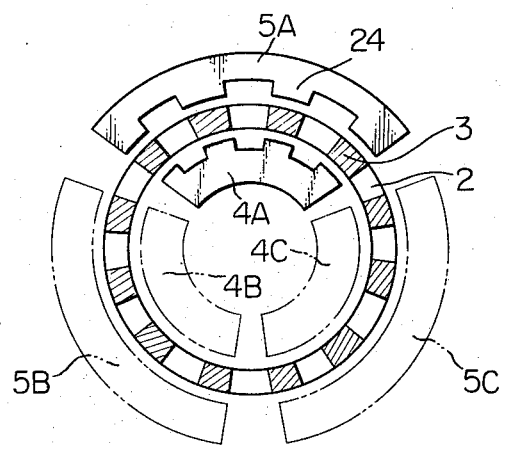
Figure 4:
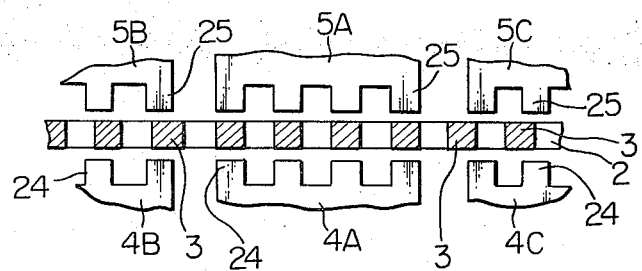
Figure 5:
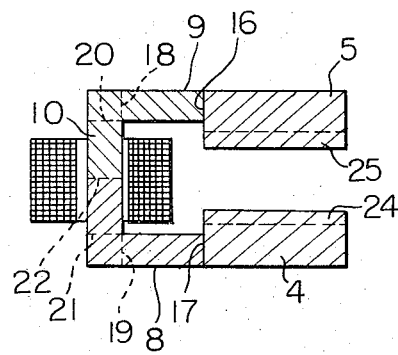
Figure 6:
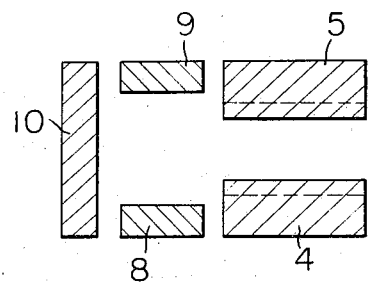

FIG. 1 is a fragmentary longitudinal section view of an electric pulse motor according to the present invention, FIG. 2 is a perspective view of the rotor of the motor of FIG. 1, FIG. 3 iw a schematic cross-section view showing the arrangement of the rotor and stator of FIG. 1, FIG. 4 is a fragmentary developed view of rotor-teeth and stator-teeth of FIG. 3, FIG. 5 is a cross-section view of examples of a separable structure of the stator element of an electric pulse motor according to the present invention, FIG. 6 is a cross-section view of an example of a separated stator element of an electric pulse motor according to the present invention.

As shown in FIG. 1, a rotating member of the pulse motor according to the invention comprises a rotor-shaft 1, and a single cup-shaped rotor element 2 coupled coaxially with the rotor-shaft 1.

The rotor element 2 is provided with a plurality of rotor-teeth 3 arranged on a circumference at predetermined pitches and projecting in the axial direction thereof.

Stator pieces 4 and 5 are arranged so as to have the rotor-teeth 3 extend axially between them and are spaced therefrom in the radial direction thereof. The stator pieces are also provided with stator-teeth 24, 25 with the same pitch as the rotor-teeth 3 on their surfaces facing the rotor-teeth 3.

A non-magnetic spacer 6 defines inner and outer radial gaps between the stator pieces 4, 5 and opposite surfaces of the rotor-teeth 3. A U-shaped yoke 7 includes leg portions 8, 9 and a base leg portion 10. The U-shaped yoke 7 is attached to the stator pieces 4 and 5 at the edge portion of the leg portions 8, 9, and is provided with a winding 11 on the base leg portion 10.

Therefore, the U-shaped stator element of respective phases is composed of the stator pieces 4 and 5, the yoke 7 and the winding 11. When the winding 11 is energized by an electric pulse signal, corresponding stator pieces 4 and 5 are excited so as to behave as magnetic polepieces producing magnetic poles on the confronting surfaces of the stator-teeth 24, 25. Thus, these rotor teeth 3 which are positioned between the excited stator pieces 4 and 5, also produce magnetic poles on the opposite surfaces thereof, so that the later-described stepping motion of the rotor element 2 is produced.

The entire stator elements are mounted in motor cases 12 and 13, and the cases 12 and 13 support the rotor-shaft 1 by means of bearings 14 and 15. In FIG. 1, th ere can be seen only one stator element corresponding to one phase, but a predetermined number of stator elements are arranged to encircle the rotor element 2 while corresponding to a predetermined number of different phases.

FIG. 2 is a perspective view of the rotor element of the motor according to the present invention as shown in FIG. 1. It should be noted that only one cup-shaped rotor element 2 is required in order to construct the motor and a plurality of rotor-teeth extend coaxially from the circumference of a disc 26, so that a small moment of inertia of a rotatable rotor is provided to thereby accomplish high speed starting and high speed stopping of rotation. Thus the torque-inertia characteristic of an electric pulse motor according to the present invention can be very excellent.

FIG. 3 illustrates diagrammatically an example of the arrangement of the stator elements in a three phase pulse motor, in which the rotor element 2 has a plurality of rotor-teeth 3 at equal pitches in the circumferential direction, and the stator elements of respective phases are arranged in such a manner that the stator-teeth between different phases of the stator elements is shifted spatially in a circumferential direction. The stator pieces 5A and 4A are formed into fan shapes while extending in the circumferential direction by about 120° and are provided with a plurality of stator-teeth having the same face width as the rotor-teeth and arranged at the same angular pitch as the rotor-teeth, respectively. In FIG. 3, also schematically shown, are stator pieces 4B and 5B of B-phase and stator pieces 4C and 5C of C-phase.

Referring to FIG. 4, it can be seen that the stator-teeth 24, 25 of the B-phase and C-phase stator elements are staggered spatially in the opposite directions by one third of the rotor-teeth pitch with respect to the stator-teeth of the A-phase stator element, respectively.

An operation of the above-explained electric pulse motor will be illustrated in the following manner.

In FIG. 3, when the winding of an A-phase stator element is excited, the rotor element 2 steps to the position where its rotor-teeth 3 face and align with the stator-teeth of the stator pieces 4A and 5A. In this position, magnetic poles on the rotor-teeth 3 face and align with magnetic poles on the stator-teeth of the stator pieces 4A, 5A. As a result magnetic flux, as shown in FIG. 1 by an arrow line 4, flowing through the rotor-teeth and the stator-teeth undergoes the minimum reluctance.

Subsequently, the B-phase winding is excitation of the A-phase. Then, the rotor element 2 steps to the position where its rotor-teeth 3 face and align with the stator-teeth of the B-phase stator element. Further, when the C-phase winding is excited while cutting off the excitation of the B-phase, the rotor element 2 steps to the position where its rotor-teeth 3 face and align with the stator-teeth of the C-phase stator pieces 4C and 5C.

In addition to the above-mentioned excitation method, it is of course, possible to apply the known two phases-one phase excitation method or some other method for driving the pulse motor according to the present invention. Moreover, the number of phases is not limited to three and also, the position where the stator winding on the yoke 7 is installed is never limited to the base leg position shown in FIG. 1. For example, windings are capable of being installed at both leg positions of the yoke of the stator element so that the number of windings is, of course, never limited to one. Adequate increase of the number of windings may increase the magnetic flux stream 4, whereby output power of the electric pulse motor becomes larger. It should be noted that the output power of the pulse motor of the present invention can also be increased by increasing the number of the rotor-teeth 3 and the stator-teeth 24, 25 of each stator element, since increase of the number of these teeth provide an increase of magnetic poles. According to the above-mentioned electric pulse motor structure of the present invention, only one rotor element is required for the motor operation, so that not only the inertia of the rotor is capable of being less as explained before referring to FIG. 2, but also, the pulse motor may be compact compared with the known pulse motor having multi-rotor elements. Further, the pulse motor of the present invention is provided with a structure in which the stator-teeth enclose the rotor-teeth in the radial direction, so that the motor may also be compact due to the design which prevents the pulse motor from radially expanding.

The other constructional feature of the pulse motor according to the present invention will now be explained, referring especially to FIG. 5 and FIG. 6.

FIG. 5 illustrates examples of a separable structure provided to the U-shaped stator element whereby one of the U-shaped stator elements including two stator pieces 4 and 5, behaving as magnetic polepieces, can be separated along anyone of, or any combination of, the lines 16 to 22. Lines 16 and 17 show a case where the magnetic polepieces 4 and 5 are separable from the yoke 7. Lines 18 and 19 show a case where the stator element is separable along the lines in parallel with a base leg portion 10 thereof. Lines 20 and 21 show a case where the stator element is separable along the lines in parallel with leg portions 8 and 9 thereof. Line 22 shows a case where the stator element is separable at the center thereof.

FIG. 6 illustrates an example of the stator element which is in a separated state along the lines 16, 17, 18 and 19 of FIG. 5. As seen from FIG. 6, the base leg portion 10, the leg portions 8 and 9, and polepieces 4, 5 are first separately machined. Subsequently, winding or coil 11 is installed on the base leg portion 10. Then, the respective separate portions 4, 5, 8, 9 and 10 are assembled into a unitary stator element as shown in FIG. 5 while defining a radial gap between polepieces 4 and 5. As a result, fabrication and assembly of the stator element can be simplified, since each respective separate portion 4, 5, 8, 9 and 10 has a relatively simple shape so as to be easily and accurately machined; also, the winding of coil 11 can be installed on the base leg portion 10 before the portion 10 is assembled.

This easy fabrication and assembly will provide a particular advantage for mass production of the pulse motor, as well as providing for production of a low cost motor.

It should be noted that, of course, non magnetic spacer member 6 may be used for accurately defining the small radial gaps between polepieces 4, 5 and opposite surfaces of the rotor-teeth 3 as shown in FIG. 1. Consequently, leakage of magnetic flux becomes the minimum level possible.

It will now be understood that there is provided by the present invention an electric pulse motor of excellent characteristics with superior torque-inertia ratio, which is both compact capable of being easily assembled.

What is claimed is:

1. An electric pulse motor comprising: a rotor provided with a single cup-shaped rotor element rotatable about an axis of rotation of the rotor shaft, the rotor element having a plurality of circumferentially spaced rotor-teeth disposed circumferentially of the axis of rotation of the rotor element, said rotor-teeth extending axially and having an equal spacing, thereby having a common and equal pitch, said rotor-teeth comprising magnetic polepieces; a stator provided with a plurality of U-shaped separate stator elements disposed circumferentially of the single cup-shaped rotor element to encircle the rotor element and corresponding to a predetermined number of different phases, each stator element having a base leg axially spaced from the rotor-teeth defining axial gaps therebetween, each of said stator elements having two legs radially spaced from the rotor teeth and disposed on opposite sides of the rotor-teeth and having teeth opposed to the rotor-teeth and spaced therefrom, defining radial gaps on opposite sides of the rotor-teeth, the teeth of the stator elements behaving as polepieces upon excitation and being shifted in a circumferential direction out of exact radial registry with said corresponding rotor-teeth, and electrically energizable windings on each of said stator elements for developing flux across the gaps between said rotor-teeth polepieces and said stator-teeth polepieeces for rotatably driving the motor.

2. An electric pulse motor comprising, a cup-shaped rotor rotatable about an axis of rotation and having a plurality of circumferentially spaced rotor-teeth disposed circumferentially of the axis of rotation of the rotor, said rotor-teeth extending axially and having an equal spacing thereby having a common and equal pitch, said teeth constituting polepieces, a stator comprising a plurality of U-shaped separate stator elements each having a base leg axially spaced from respective rotor-teeth and polepieces thereon defining axial gaps therebetween, each of said stator elements having two legs radially spaced from respective rotor-teeth and disposed on opposite sides of the rotor-teeth and having teeth opposed to the rotor-teeth and spaced therefrom defining radial gaps on opposite sides of the rotor-teeth, the teeth of the stator elements being disposed opposed to the corresponding rotor-teeth shifted in a circumferential direction out of exact radial registry with said corresponding rotor-teeth, (and) electrically energizable windings on each of said stator elements for developing flux across the gaps between said rotor-teeth polepieces and said stator-teeth for rotatably driving the motor, and each of said stator elements having a non magnetic spacer member disposed between said polepieces to establish said radial gaps on opposite sides of the rotor-teeth.

3. An electric pulse motor according to claim 1, in which said windings comprise coils on the base leg of each respective stator element.

4. An electric pulse motor according to claim 3, in which said rotor-teeth are arranged in a circle, and in which the stator elements are arcuate in cross-section.

* * * * *